United States Patent
Huang

(10) Patent No.: US 7,031,557 B2
(45) Date of Patent: Apr. 18, 2006

(54) STRUCTURE CAPABLE OF REDUCING THE AMOUNT OF TRANSFERRED DIGITAL IMAGE DATA OF A DIGITAL DISPLAY

(75) Inventor: Shih-Hsiung Huang, Pingjen (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 707 days.

(21) Appl. No.: 10/310,874

(22) Filed: Dec. 6, 2002

(65) Prior Publication Data

US 2003/0142870 A1    Jul. 31, 2003

(30) Foreign Application Priority Data

Dec. 7, 2001    (TW) .............................. 90221411 U

(51) Int. Cl.
   *G06K 9/00*    (2006.01)

(52) U.S. Cl. ...................... 382/318; 382/319; 382/232; 382/233

(58) Field of Classification Search ................ 382/318, 382/319, 320, 321, 232, 233; 348/42, 51
See application file for complete search history.

(56) References Cited

U.S. PATENT DOCUMENTS 6,061,083 A * 5/2000 Aritake et al. ................ 348/51

FOREIGN PATENT DOCUMENTS

| JP | 408110944 A * | 4/1996 |
| JP | 408179754 A * | 7/1996 |

OTHER PUBLICATIONS

Hosotani et al., "A Display Processor Conforming to all DTV Formats with 188-TAP FIR Filters and 284Kb FIFO Memories", IEEE, vol. 43, No. 3, Aug. 1997, pps. 837-847.*

* cited by examiner

*Primary Examiner*—Anh Hong Do
(74) *Attorney, Agent, or Firm*—Bacon & Thomas, PLLC

(57) ABSTRACT

A structure capable of reducing the amount of transferred digital image data of a digital display has a digital image and timing control unit for controlling the receiving and transfer of image data and providing timing control. The digital image and timing control unit includes at least one first and second registers, a data address flag unit, and a control logic. The first and second registers serves to buffer the image data of the n-th image data line and (n+1)-th image data line. The control logic compares the image data and enables the flags in the data address flag unit corresponding to the image position to be updated, so as to determine the image data to be transferred.

9 Claims, 5 Drawing Sheets

STRUCTURE CAPABLE OF REDUCING THE AMOUNT OF TRANSFERRED DIGITAL IMAGE DATA OF A DIGITAL DISPLAY

BACKGROUND OF THE INVENTION

1. Field of the Invention

The present invention relates to the technical field of image data transfer, and particularly to a structure capable of reducing the amount of transferred digital image data of a digital display.

2. Description of Related Art

In transferring digital image data, for example from a personal computer to a digital display, or inside a digital display, a set of data is transferred per clock (CLK). Referring to FIGS. 1 and 2, the structure for transferring digital image data of a digital display and the timing are illustrated. The data transferred at each clock includes image data (R/G/B data, INV1, INV2) and related horizontal and vertical control signals (STH, LD, POL, CLKV), which are processed by a digital image and timing control unit 11 in the display for driving a horizontal signal processing unit 12 and a vertical signal processing unit 13. Thereby, after the digital display receives the entire horizontal signals, the horizontal signals are outputted to an effective display area 14 in the digital display so as to form a complete display frame.

When the digital image data is transferred through Internet, the horizontal and vertical control signals of the digital image data must be encoded and compressed for being transferred.

Since the size of digital data to be transferred is relative huge, the power required for data transfer is very large. Therefore, it is likely to generate EMI and the occupied bandwidth is large. Accordingly, the conventional digital image data transfer technology is desired to be improved.

SUMMARY OF THE INVENTION

Accordingly the primary object of the present invention is to provide a structure capable of reducing the amount of transferred digital image data of a digital display, wherein only the varied part of the image data is necessary to be transferred so as to reduce the amount of transferred digital image, the required power and EMI radiation, and further to decrease the required bandwidth.

To achieve object, the structure capable of reducing the amount of transferred digital image data of a digital display in accordance with the present invention comprises: a display area for displaying digital image; a digital image and timing control unit for controlling receiving or transferring of digital image data and providing timing; a horizontal signal processing unit for retaining one line of input digital image data under the control of the digital image and timing control unit, and transferring the retaining image data to the display area; and a vertical signal processing unit for outputting scanning signals to the display area under the control of the digital image and timing control unit to drive the display area for displaying input digital image. The digital image and timing control unit includes at least first and second registers, a data address flag unit having a plurality of flags, and a control logic. The first and second registers buffer the image data of n-th image data line and (n+1)-th image data line for comparing image data using the control logic to enable flags of the data address flag unit corresponding to image positions required to be updated, thereby determining image data to be transferred.

The various objects and advantages of the present invention will be more readily understood from the following detailed description when read in conjunction with the appended drawing.

DETAILED DESCRIPTION OF THE PREFERRED EMBODIMENTS

Figure 1:
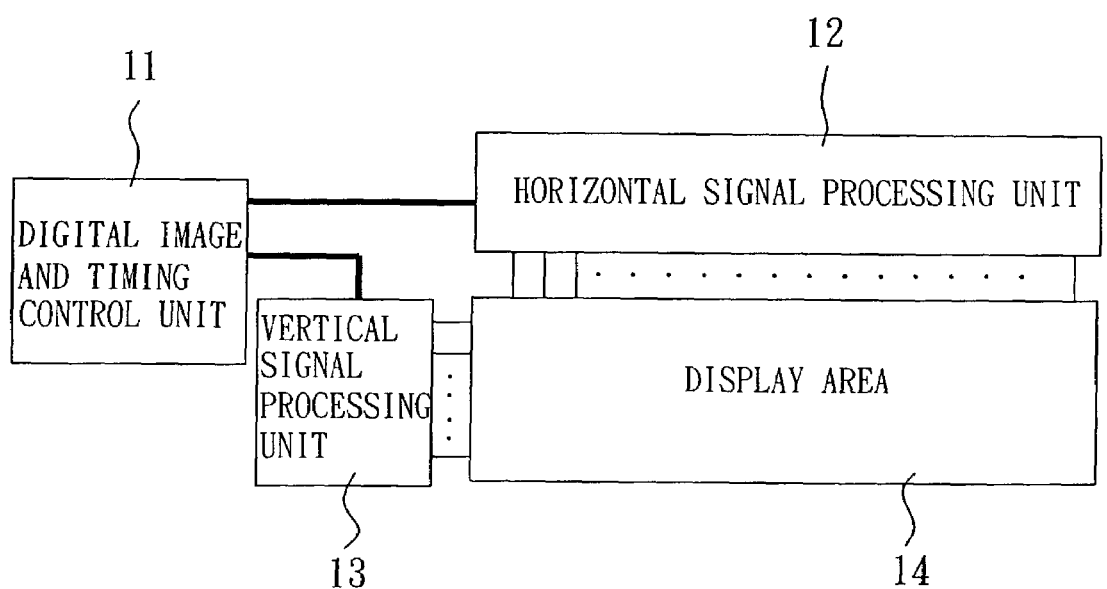
FIG. 1 shows the digital image data transfer structure in a conventional digital display.
Figure 2:
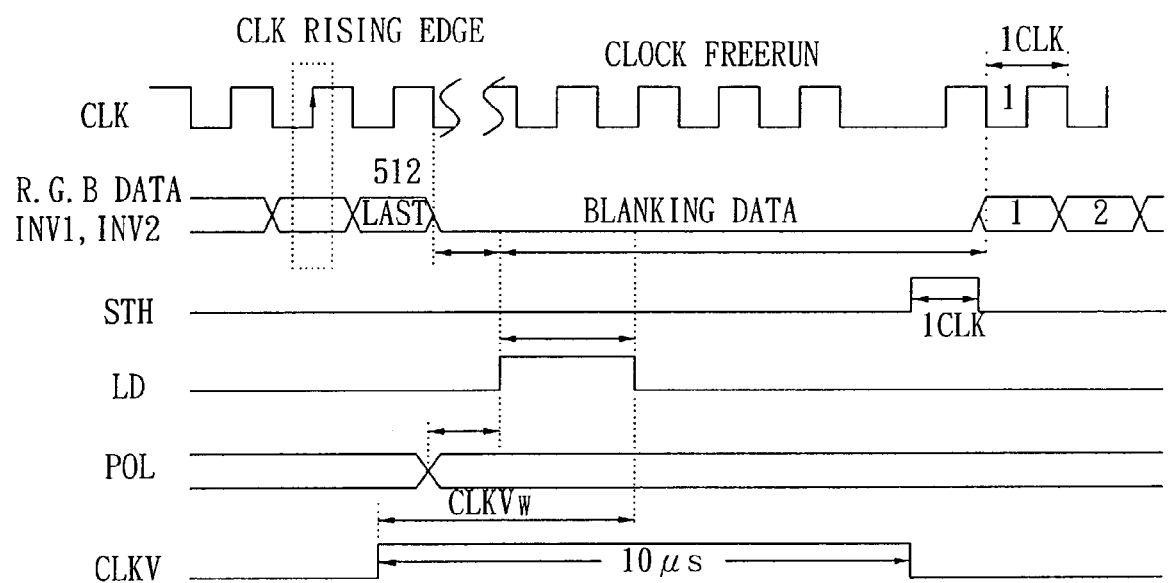
FIG. 2 shows the timing about the transfer of the conventional digital image data.
Figure 3:
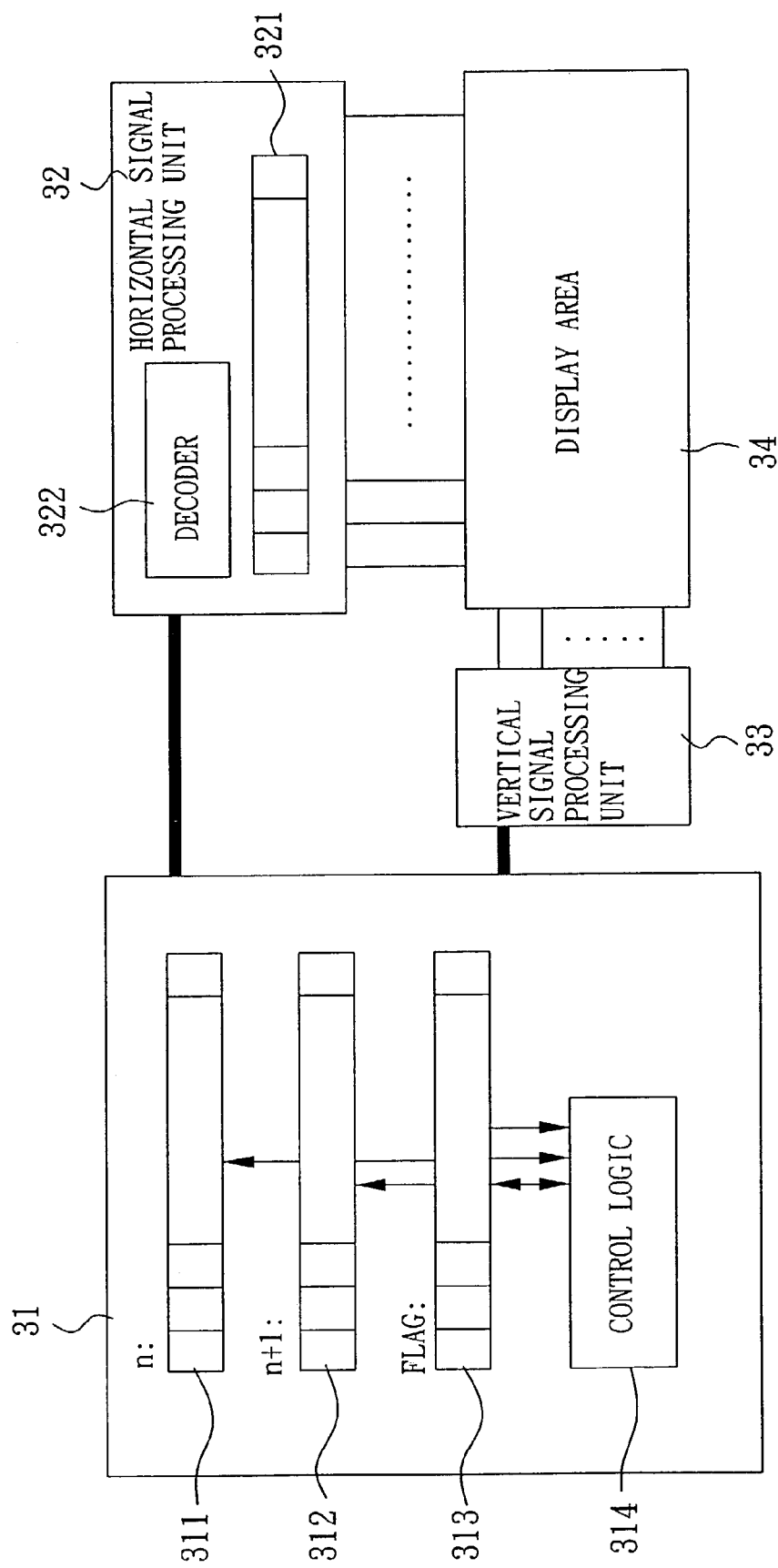
FIG. 3 shows the structure capable of reducing the amount of transferred digital image data of a digital display in accordance with the present invention.

With reference to FIG. 3, a preferred embodiment of the structure capable of reducing the amount of transferred digital image data of a digital display in accordance with the present invention is illustrated. The structure of the present invention includes a digital image and timing control unit 31, a horizontal signal processing unit 32, a vertical signal processing unit 33 and a display area 34. The digital image and timing control unit 31 serves to control the receiving and transfer of the digital image data and provides related timing control. The horizontal signal processing unit 32 has a complete horizontal line image data register circuit 321. Thereby, under the control of the digital image and timing control unit 31, a line of input digital image data can be retained and the retained digital image can be sent to the display area 34. The vertical signal processing unit 33 is controlled by the digital image and timing control unit 31 to output scanning signal to the display area 34 for driving the display area 34 to display input digital images.

The digital image and timing control unit 31 must include at least two horizontal image data registers 311 and 312, a data address flag unit 313, and a control logic 314. The way for transferring digital image is based on the horizontal image data line. Therefore, as the system is started, the pixels of the first image line are sent one by one by the digital image and timing control unit 31 in the display. Next, the n-th and (n+1)-th image data line are buffered in the first register 311 and second register 312. The control logic 314 performs the comparison of the image data. Then, the image positions in the data address flag unit 313 necessary to be updated is enabled according to the result of comparison for determining the image necessary to be sent. For this digital image and timing control unit 31, the horizontal signal processing unit 32 must have a corresponding decoding logic 322 for decoding correct data and then the data is buffered in the horizontal line image data register circuit 321 for being displayed in the display 34.

Under the structure capable of reducing the amount of transferred digital image data of a digital display in accordance with the present invention, if the image data of (n+1)-th line to be displayed is identical to the image data of n-th line, the digital image and timing control unit 31 will not send the digital image data to the horizontal signal processing unit 32. The digital image and timing control unit 31 will send the control signals of the (n+1)-th image data line. The n-th image data line recorded in the horizontal signal processing unit 32 is directly used as the image data of the (n+1)-th image data line. Thereby, there is no image data to be transferred. The flags of the data address flag unit 313 are all "low" (negative logic) so that the horizontal signal processing unit 32 will not update image data.

Figure 4:
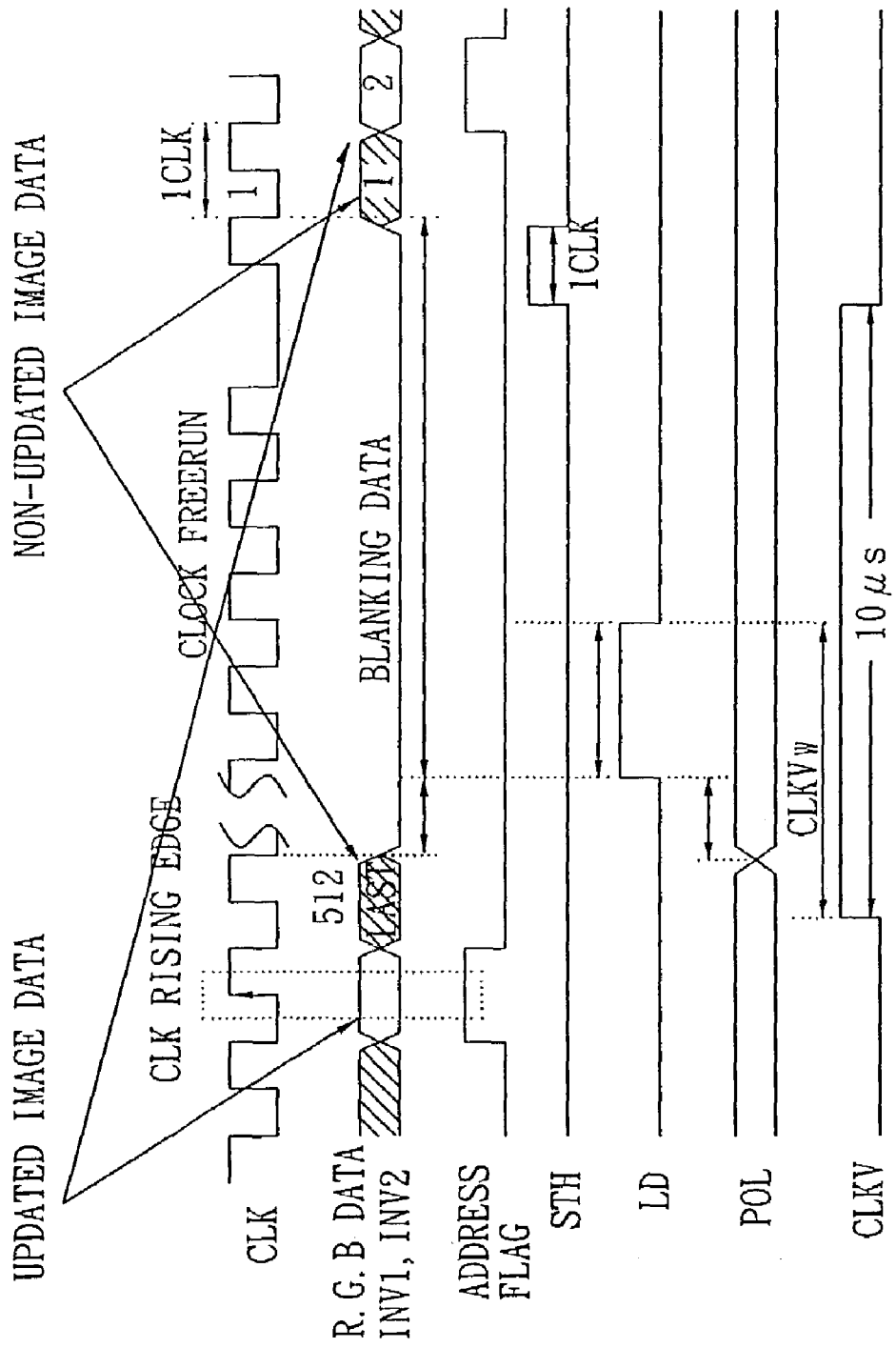
FIG. 4 shows the timing of the structure capable of reducing the amount of transferred digital image data of a digital display in accordance with present invention.

If the (n+1)-th image data line is not the same as the n-th image data line, the digital image and timing control unit 31 only transfers a part of the digital image data to the horizontal signal processing unit 32. The part of the digital image data is different from the previous one. Some of the flags of the data address flag unit 313 are "high" (positive logic) for enabling the image positions required to be updated. That is, in case the n-th image data line and (n+1)-th image data line have a difference of 20%, only the 20% difference image is transferred. The timing of this example is illustrated in FIG. 4.

In case the (n+1)-th image data line is the left or right shift of the n-th image data line, namely, the (n+1)-th image data line is the dynamic image of the n-th image data line, the digital image and timing control unit 31 will left- or right-shift the n-th image data line recorded in the horizontal signal processing unit 32. Then, the empty space of the image due to the left or right shift is filled with data by the digital image and timing control unit 31. Thereby, only the data about the empty space, the image data address, and left and right shift control signals are transferred for completing the (n+1)-th image data line transfer. With such a method to transfer data, there is a requirement to have the left and right shift control signal lines.

Figure 5:
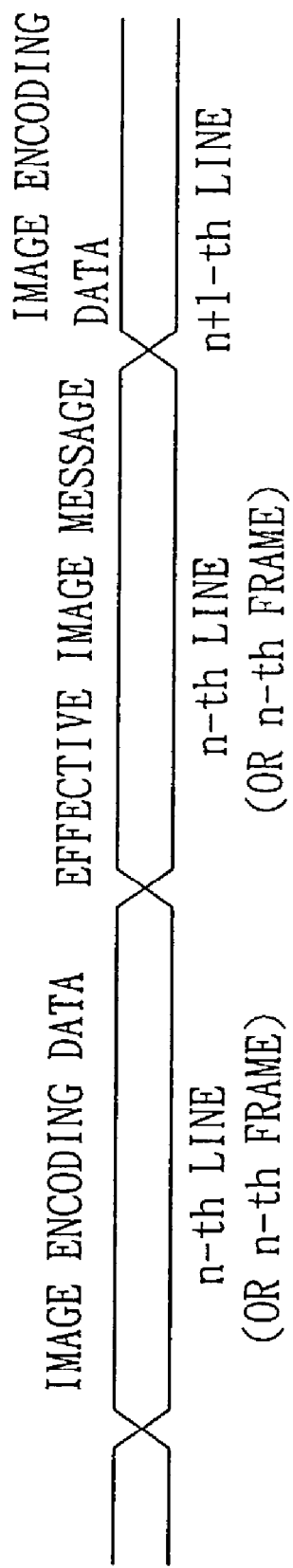
FIG. 5 shows the timing of the structure capable of reducing the amount of transferred digital image data of a digital display applied in Internet in accordance with the present invention.

Moreover, the same structure can be applied to Internet for transferring digital image, as illustrated in FIG. 5. The respective n-th image data line and control signal corresponding to those to be transferred by the digital image and timing control unit 31 is encoded into the image encoding data of n-th line (or n-th image frame), and the effective image message of n-th line (or n-th image frame). The encoded data includes image address data to be updated and image left/right shift control signals. The effective image message is the effective image message to be transferred after being encoded.

In view of the foregoing, it is appreciated that when using the present invention to construct the digital image data, only the varied part of the image data is necessary to be transferred, so as to reduce the amount of digital image transfer of a digital display and further reduce the power and EMI radiation in data transfer. Moreover, the bandwidth of data transferred can be decreased. In addition, the digital image transfer efficiency can be improved by using digital image data transfer of Internet.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A structure capable of reducing the amount of transferred digital image data of a digital display comprising:
   a display area for displaying digital image;
   a digital image and timing control unit for controlling receiving or transferring of digital image data and providing timing;
   a horizontal signal processing unit for retaining one line of input digital image data under the control of the digital image and timing control unit, and transferring the retaining image data to the display area; and
   a vertical signal processing unit for outputting scanning signals to the display area under the control of the digital image and timing control unit to drive the display area for displaying input digital image;
   wherein the digital image and timing control unit includes at least first and second registers, a data address flag unit having a plurality of flags, and a control logic; the first and second registers buffer the image data of n-th image data line and (n+1)-th image data line for comparing image data using the control logic to enable flags of the data address flag unit corresponding to image positions required to be updated, thereby determining image data to be transferred.

2. The structure capable of reducing the amount of transferred digital image data of a digital display as claim in claim 1, wherein the horizontal signal processing unit has a decoding logic for decoding correct data from the digital image and timing control unit and the decoded data is registered in a horizontal line image data register circuit for driving the display area.

3. The structure capable of reducing the amount of transferred digital image data of a digital display as claim in claim 2, wherein when image data of the n-th image data line is identical to the image data of the (n+1)-th image data line, the digital image and timing control unit transfers control signals of the (n+1)-th image data line, and the image data of the n-th image data line recorded in the horizontal signal processing unit is used as the image data of the (n+1)-th image data line.

4. The structure capable of reducing the amount of transferred digital image data of a digital display as claim in claim 3, wherein when the flags the data address flag unit are all in "low" (negative logic), the horizontal signal processing unit dose not update image data.

5. The structure capable of reducing the amount of transferred digital image data of a digital display as claim in claim 2, wherein when the image data of the n-th image data line is not identical to that of the (n+1)-th image data line, the digital image and timing control unit only transfers varied image data to the horizontal signal processing unit.

6. The structure capable of reducing the amount of transferred digital image data of a digital display as claim in claim 5, wherein the digital image and timing control unit sets the flags of the data address flag unit at "high" (positive logic) to enable the image positions required to be updated.

7. The structure capable of reducing the amount of transferred digital image data of a digital display as claim in claim 2, wherein when the image data of the (n+1)-th image data line is a left or right shift of the image data of the n-th image data line, the digital image and timing control unit left or right shifts the image data of the n-th image data line, and empty space due to the left or right shift of the image data in the n-th image data line is filled with data by the digital image and timing control unit.

8. The structure capable of reducing the amount of transferred digital image data of a digital display as claim in claim 1, wherein the image data of the n-th image data line and the control signals transferred by the digital image and timing control unit are encoded as image encoding data and effective image message of the n-th image data line so as to be transferred through Internet.

9. The structure capable of reducing the amount of transferred digital image data of a digital display as claim in claim 8, wherein the image encoding message includes image address messages to be updated and left and right control signals of the image, and the effective image message is image message required to be transferred after encoded.

* * * * *